(12) United States Patent
Sorensen

(10) Patent No.: US 10,384,603 B1
(45) Date of Patent: Aug. 20, 2019

(54) VEHICLE MONITOR

(71) Applicant: OCC Technologies, LLC, Lisle, IL (US)

(72) Inventor: Tom Lee Sorensen, Naperville, IL (US)

(73) Assignee: International Engine Intellectual Property Company, LLC., Lisle, IL (US)

(*) Notice: Subject to any disclaimer, the term of this patent is extended or adjusted under 35 U.S.C. 154(b) by 0 days.

(21) Appl. No.: 15/882,659

(22) Filed: Jan. 29, 2018

(51) Int. Cl.
*B60Q 9/00* (2006.01)

(52) U.S. Cl.
CPC ................. *B60Q 9/008* (2013.01)

(58) Field of Classification Search
CPC ........... B60W 50/14–16; B60K 35/00; B60K 2350/106; B60Q 9/00
USPC ........ 340/438, 435, 903, 426.1, 426.28, 431
See application file for complete search history.

(56) References Cited

U.S. PATENT DOCUMENTS

| | | | |
|---|---|---|---|
| 5,646,845 A | 7/1997 | Gudat et al. | |
| 5,691,695 A | 11/1997 | Lahiff | |
| 5,999,091 A * | 12/1999 | Wortham | G07C 5/008 340/431 |
| 6,933,837 B2 * | 8/2005 | Gunderson | B60R 21/013 340/435 |
| 7,295,925 B2 | 11/2007 | Breed et al. | |
| 7,414,520 B2 | 8/2008 | Meissner | |
| 8,013,759 B1 * | 9/2011 | Aid | B60D 1/58 340/431 |
| 8,775,023 B2 | 7/2014 | Frojdh et al. | |
| 9,117,371 B2 | 8/2015 | Hutchings | |
| 9,164,619 B2 | 10/2015 | Goodlein | |
| 2011/0084852 A1 * | 4/2011 | Szczerba | B60Q 3/80 340/438 |
| 2011/0140918 A1 * | 6/2011 | Jain | B60R 16/02 340/435 |
| 2014/0218213 A1 * | 8/2014 | Schneider | B60Q 9/008 340/905 |
| 2014/0375447 A1 * | 12/2014 | Raghunathan | H04W 4/046 340/462 |
| 2015/0191122 A1 * | 7/2015 | Roy | B60W 40/09 340/439 |
| 2015/0367770 A1 * | 12/2015 | Newton-Dunn | B60W 40/09 340/438 |
| 2016/0052490 A1 * | 2/2016 | Hardy | B60R 25/1001 340/426.1 |
| 2017/0144688 A1 | 5/2017 | Pitzer | |

* cited by examiner

*Primary Examiner* — Travis R Hunnings
(74) *Attorney, Agent, or Firm* — Jeffrey P. Calfa; Jack D. Nimz

(57) ABSTRACT

Disclosed herein are multiple embodiments of apparatus and method for providing an operator of a vehicle with output from at least one detector associated with the vehicle. According to one embodiment, at least one detector is operatively associated with a vehicle. At least one parameter of the vehicle is monitored with the at least one detector operatively associated with the vehicle. Output is generated with the at least one detector. The operator of the vehicle is provided with the output of the at least one detector such that operator distraction is not increased.

3 Claims, 2 Drawing Sheets

VEHICLE MONITOR

BACKGROUND

This patent application relates to a mechanism and a method for monitoring a vehicle.

A vehicle, such as a truck, a tractor-trailer combination, a boat, a plane and the like may comprise at least one detector operatively associated with the vehicle. The at least one detector monitors an aspect, such as the vehicle speed, the vehicle temperature, ambient temperature and the like, of the vehicle and/or its surroundings. The at least one detector may include a camera that takes either motion or still images. A vehicle operator, such as an operator physically associated with the vehicle, an operator located remotely from the vehicle, a computer and the like, may benefit from access to an output from the at least one detector on the vehicle and/or an element, such as a battery of the vehicle, an alternator of the vehicle, a fuel level sensor of the vehicle, and the like of the vehicle.

The output of at least one detector may be provided to the vehicle operator in many ways. However, if the output of at least one detector is made available to a vehicle operator physically associated with the vehicle on a flat screen associated with a vehicle dashboard, for example, the output may increase vehicle operator distraction. This vehicle operator may "take eyes off of the road", thereby increasing possibility of an accident. Some estimates show that approximately 70% of all traffic accidents are caused by vehicle operator distraction. Accordingly, it is desirable to provide output of at least one detector to a vehicle operator in a manner that does not increase vehicle operator distraction.

SUMMARY

Disclosed herein are multiple embodiments of apparatus and method for providing an operator of a vehicle with output from at least one detector associated with the vehicle. According to one embodiment, at least one detector is operatively associated with a vehicle. At least one parameter of the vehicle is monitored with the at least one detector operatively associated with the vehicle. Output is generated with the at least one detector. The operator of the vehicle is provided with the output of the at least one detector such that operator distraction is not increased.

DETAILED DESCRIPTION

Embodiments disclosed here generally relate to a method and apparatus for providing a vehicle 10 operator with output from at least one detector 12 operatively associated with a vehicle 10. More specifically, embodiments disclosed herein relate to a method and apparatus for providing a vehicle 10 operator with output from at least one detector 12 operatively associated with a vehicle 10 in a manner that does not increase likelihood of vehicle 10 operator distraction. In some embodiments, output from at least one detector 12 associated with a vehicle 10 is provided to a vehicle 10 operator by items, such as a warning light, a gauge display and the like, adjacent other mechanisms, such as but not limited to steering wheel, stalk control, gear shifter, parking brake control, trailer release, and the like, disposed on the vehicle 10. In other embodiment, output from the at least one detector 12 is provided to a vehicle 10 operator for display on an instrument, such as a cell phone, tablet, computer or the like. This output may be provided to the vehicle 10 operator in real time, viz. without delay. Embodiments described herein can provide visual and/or audio feedback to the vehicle 10 operator while the vehicle 10 operator is controlling the vehicle 10.

Figure 2:
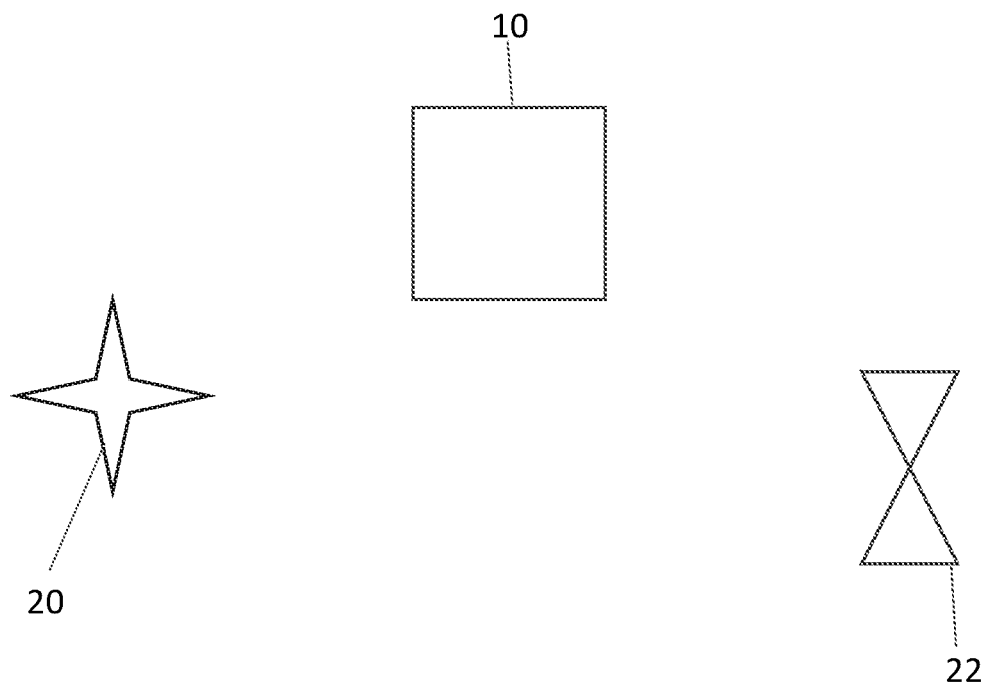
FIG. 2 is a representation of an image shown on a video screen of one of the embodiments disclosed herein.

In one embodiment, the at least one detector 12 associated with the vehicle 10 comprises radar which may be part of a collision avoidance system. Output from this at least one detector 12 may be provided to the vehicle 10 operator through a video screen disposed on a vehicle 10 steering wheel. As shown in FIG. 2, the video screen may show a representation of environment, such as a road, of the vehicle 10. An object 14, such as another vehicle, a bridge support and the like, detected by the at least one detector 12, is shown in relation to a representation of the vehicle 10 operator's vehicle 10.

Figure 1:
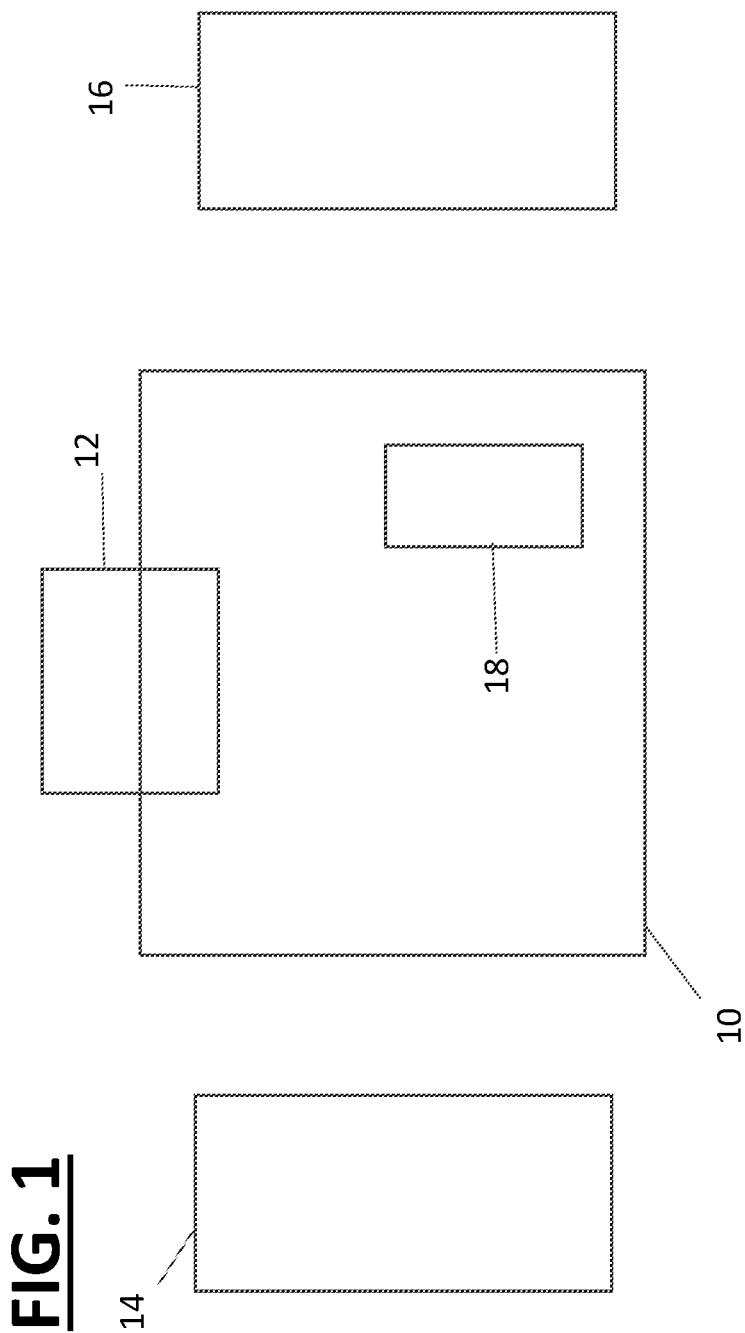
FIG. 1 is a diagram of an environment of a vehicle having an apparatus described herein.

In some embodiments, as shown in FIG. 1, the vehicle 10, which may be stationary or in motion, is disposed among at least a first object 14 and a second object 16. The first object 14 and/or the second object 16 may be another vehicle on a road. The at least one detector 12 determines presence of the first object 14 and the second object 16. Output, such as an electric signal, of the at least one detector 12 can include sorting or ranking of an indicator of the first object 14 and an indicator of the second object 16. This sorting or ranking may be done according to other factors, such as physical distance to the vehicle 10 of the vehicle 10 operator, velocity of the object 14 and/or 16 with respect to the vehicle 10 of the vehicle 10 operator and the like. This sorting or ranking may be expressed to the vehicle 10 operator as a wavelength, i.e. electromagnetic wavelength, acoustic wavelength and the like, associated with the indicators.

For example, as shown in FIG. 2, a first object 14 existing within a first distance from the vehicle 10 of the vehicle 10 operator may be assigned a first indicator 20 of a first wavelength while a second object 16 existing within a second distance from the vehicle 10 of the vehicle 10 operator may be assigned a second indicator 22 of a second wavelength. Both the first indicator 20 and the second indicator 22 are included in the output of the at least one detector 12. In this manner, when output of the at least one detector 12 associated with the vehicle 10 of the vehicle 10 operator is provided to the vehicle 10 operator, the vehicle 10 operator can determine disposition of the first object 14 and the second object 16 with respect to the vehicle 10 of the vehicle 10 operator by identifying the first indicator 20 of the first object 14 and the second indicator 22 of the second object 16.

In another embodiment, the at least one detector 12 comprise a camera and a motion detector associated with the vehicle 10. The camera and motion detector may monitor a portion of the vehicle 10 of the vehicle operator. In one example, the portion of the vehicle 10 comprises an access 18, such as a door on a trailer. The at least one detector 12 monitors status of the access 18. The operator of the vehicle 10 is provided with output of the at least one detector 12, thereby possibly notifying the operator of the vehicle 10 of unauthorized use of the access 18, perhaps by an unauthorized person.

In yet further embodiments, output from the at least one detector 12 can be combined with output from another detector 12 and that combination can be provided to the operator of the vehicle 10. In any embodiment, output from the at least one detector 12 is provided to the operator of the vehicle 10 in a manner that does not increase operator distraction, such as by interfering with another output from another detector, such as a speedometer, but also improves response of the operator to the output. This can improve support of both operator control of the vehicle 10 and autonomous control of the vehicle 10.

What is claimed is:

1. A method for providing an operator of a vehicle with output from at least one detector associated with the vehicle, the method comprising the steps of:
  (a) operatively associating at least one detector with a vehicle;
  (b) monitoring at least one parameter of the vehicle with the at least one detector operatively associated with the vehicle;
  (c) generating output with the at least one detector;
  (d) providing the operator of the vehicle with the output of the at least one detector such that likelihood of operator distraction is not increased;
  (e) disposing the vehicle among a first object and a second object;
  (f) detecting presence of the first object and the second object with the at least one detector;
  (g) assigning a first indicator to the first object and a second indicator to the second object; and
  (h) including both the first indicator and the second indicator in the output of the at least one detector.

2. A method as defined in claim 1 further comprising the steps of:
  (i) providing the vehicle with an access;
  (j) operatively associating the at least one detector with the access; and
  (k) providing the operator of the vehicle with the output of the at least one detector to monitor the access.

3. A method as defined in claim 1 wherein the providing step (d) comprises providing the output of the at least one detector adjacent at least one of a steering wheel, a stalk control, a gear shifter, a parking brake control, or a trailer release disposed on the vehicle.

* * * * *

UNITED STATES PATENT AND TRADEMARK OFFICE
CERTIFICATE OF CORRECTION

| | | |
|---|---|---|
| PATENT NO. | : 10,384,603 B1 | Page 1 of 1 |
| APPLICATION NO. | : 15/882659 | |
| DATED | : August 20, 2019 | |
| INVENTOR(S) | : Sorensen | |

It is certified that error appears in the above-identified patent and that said Letters Patent is hereby corrected as shown below:

On the Title Page

Item (73), replace "International Engine Intellectual Property Company, LLC., Lisle, IL (US)" with --OCC Technologies, LLC, Lisle, IL (US)--

Signed and Sealed this
First Day of April, 2025

Coke Morgan Stewart
*Acting Director of the United States Patent and Trademark Office*